United States Patent [19]

Slavens

[11] Patent Number: 4,597,335

[45] Date of Patent: Jul. 1, 1986

[54] TRACK FOR WELDING CARRIAGE AND LOCATOR APPARATUS THEREFOR

[76] Inventor: Clyde M. Slavens, P.O. Box 440,577, Houston, Tex. 77244

[21] Appl. No.: 563,993

[22] Filed: Dec. 21, 1983

[51] Int. Cl.$^4$ .......................... E01B 25/08; B23K 1/00
[52] U.S. Cl. ...................................... 104/118; 29/271; 81/420; 228/29; 267/158; 267/160
[58] Field of Search ................... 104/118, 119; 238/1, 238/10 R; 29/271, 272; 81/418, 420, 425 R, 425 A, 426 A; 266/56, 67; 228/29; 219/60 A; 267/158, 160, 47

[56] References Cited

U.S. PATENT DOCUMENTS

| | | | |
|---|---|---|---|
| 3,226,027 | 12/1965 | Cable et al. | 238/1 |
| 3,380,148 | 4/1968 | Nelson et al. | 228/29 |
| 3,420,582 | 1/1969 | Shelley | 267/160 |
| 3,617,044 | 11/1971 | Strange | 81/420 |
| 3,745,638 | 7/1973 | Minera | 29/271 |
| 4,195,763 | 4/1980 | Slavens | 228/29 |
| 4,250,813 | 2/1981 | Slavens et al. | 228/29 |

Primary Examiner—Robert B. Reeves
Assistant Examiner—Donald T. Hajec
Attorney, Agent, or Firm—Carl B. Fox, Jr.

[57] ABSTRACT

Track to provide travel of a welding carriage about a pipe, including a metal band bent to encircle a pipe and being supported by slotted crossbars, the slots of the crossbars providing resiliency to the band so that the band will yield when tightened about the pipe, and so that the pipe may expand and contract under changes in temperature without longitudinal overstressing of the band and the latch connecting the ends of the band. The invention includes locator apparatus for spacing the track from the end of a pipe, including one or more adjustable locking pliers fitted to provide pipe end and track engagements and suitable to serve as a guide for locating the position of the track with respect to the pipe end.

10 Claims, 6 Drawing Figures

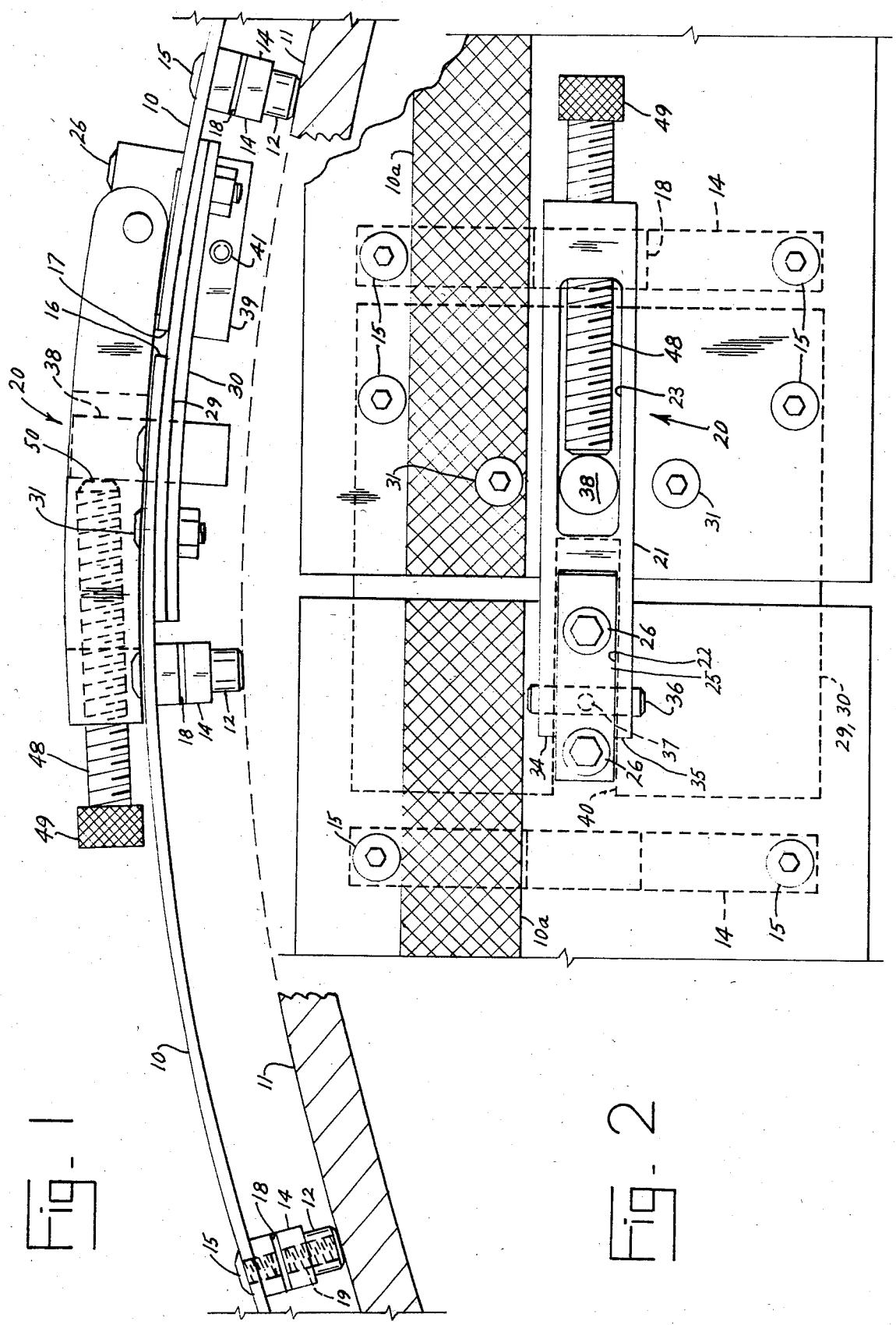

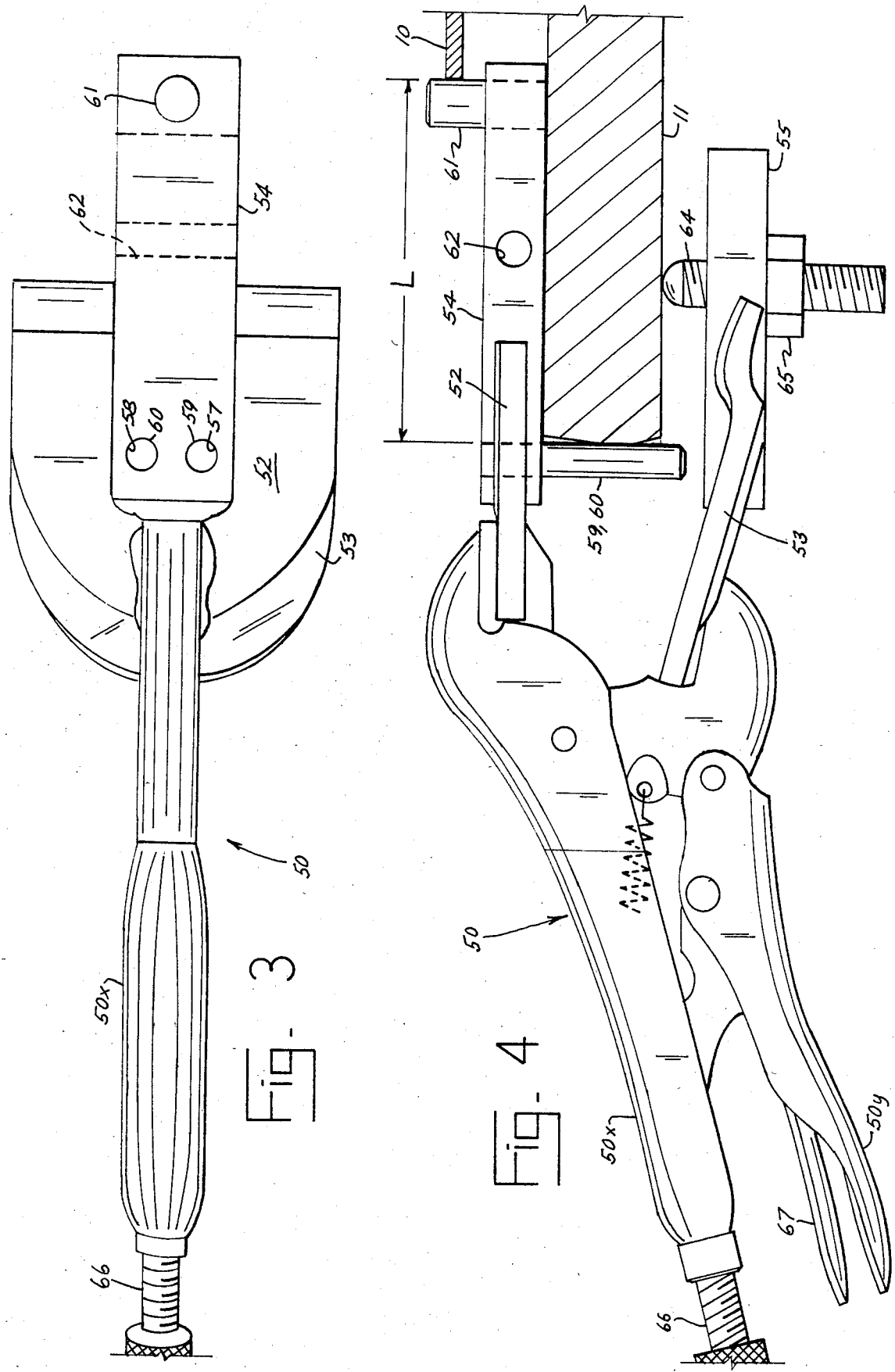

TRACK FOR WELDING CARRIAGE AND LOCATOR APPARATUS THEREFOR

BACKGROUND OF THE INVENTION

In automatic welding systems of the type herein referred to, a welding carriage travels about the pipe on a track which encircles the pipe and which is spaced from the outer pipe surface over its periphery. The track is located at a predetermined uniform distance from the pipe end, and the welding apparatus carried by the welding carriage is disposed to weld at the joint between the pipe end and the end of another section of pipe aligned and closely spaced therefrom. Since the welding of pipe lengths together in the field requires that the welding be done quickly in order to be economical, it is necessary that the track be positioned spaced from the pipe end and latched in place very rapidly and accurately. The track may be spaced from the pipe end by hand through use of a ruler, and a number of locator devices for this purpose have been developed and some are still in use, although none are entirely satisfactory. Hand locating of the track is not very rapid, and adds to the cost of welding. When a pipe is welded to another pipe, the pipe at the location of the track becomes heated, and the pipe consequently expands. The resiliency provided by the slotted crossbars of the track structure herein disclosed allows pipe expansion without breakage of the latch connecting the track ends. Therefore, the pipe can expand when hot and contract when cool without disturbing the track mounted thereon. This invention is designed to provide an improved track structure and to provide an improved track locating means whereby the track is more dependable in use and whereby the track may be more rapidly installed.

SUMMARY OF THE INVENTION

The welding carriage track provided by the invention includes a metal band bent to encircle the end of a pipe, its ends being connected together by conventional latch means. The track band has plural circularly spaced crossbars affixed therebeneath along its length which support the track above the pipe surface. The crossbars are slotted parallely to the track surface at their opposite ends and have pipe engagement fixtures secured to their inner sides at their ends, the slots providing resiliency so that the bar ends can be compressed to absorb force during tightening of the band about the pipe and to provide for expansion and contraction of the pipe during welding without causing strain to the track. The outer surface of the pipe is provided with a friction increasing surface strip against which the drive wheel or wheels of a welding carriage may reliably engage without undue slippage. The band is of a length to encircle the pipe, spaced therefrom by the crossbars and engagement fixtures, with the band ends slightly spaced apart when the band is placed about the pipe. The gap between the ends of the band is such that the driving wheels and other wheels of the welding carriage may pass thereover without interruption of the travel of the welding carriage. The track locator apparatus includes a plurality of interconnected adjustable locking pliers of the "Vise-Grip" type. The pliers are of the form often used by welders to hold hot metal objects and are modified by welding thereto a pair of blocks, one on each jaw of the pliers and providing pins for engaging the pipe end and for engaging the edge of the track, so that with the pliers gripping different locations about the pipe the track may be brought there-against for accurately locating. The plural pliers are connected together by a flexible strand, such as a cable, so that their locations around the pipe circumference may be readily ascertained. The locator pliers may be quickly affixed to the pipe end and quickly released therefrom.

A principal object of the invention is to provide an improved welding carriage track for use about the end of a pipe. Another object is to provide such a track which has resiliency so that the pipe may expand and contract without unduly increasing the tension of the track. A further object of the invention is to provide such a track wherein said resiliency is provided by slotted crossbars at the inner side of the track. Another principal object of the invention is to provide improved track locator apparatus. A further object of the invention is to provide such locator apparatus which is formed by plural adjustable locking plier structures. Yet another object of the invention is to provide such locator apparatus wherein a plurality of said locking pliers are interconnected to be properly spaced about the pipe periphery. A still further object of the invention is to provide such track and locator apparatuses which are economical, dependable, and easily operated and maintained.

Other objects and advantages of the invention will appear from the following detailed descriptions thereof, reference being made to the accompanying drawings.

BRIEF DESCRIPTION OF THE DRAWINGS

FIG. 1 is a side elevation of a portion of a track of preferred form according to the invention.

FIG. 2 is a plan view of a portion of the apparatus shown in FIG. 1.

FIG. 3 is a top view of a track locator element of preferred form according to the invention.

FIG. 4 is a side elevation of the apparatus shown in FIG. 1, showing same affixed to the end of a pipe.

DESCRIPTION OF THE PREFERRED EMBODIMENTS

Figure 5:
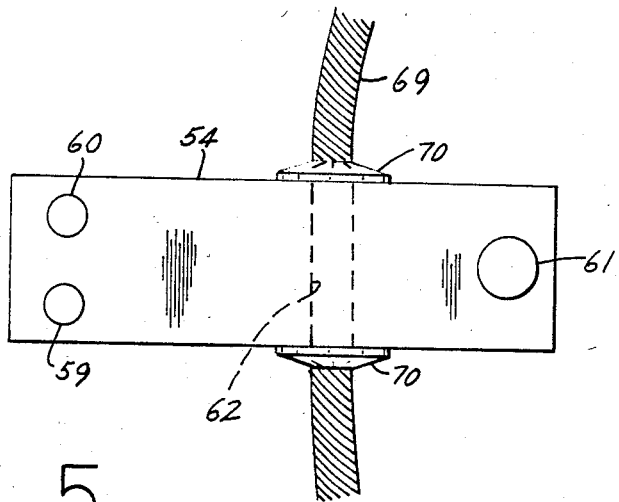
FIG. 5 is a plan view of an element of the apparatus shown in FIG. 3, showing an interconnecting cable affixed thereto.

Referring now to the drawings in detail, and first to FIGS. 1 and 2, a strap or band 10 of metal of uniform width is spaced outwardly about the outer surface of a pipe 11, or other convexly curved object, the track being supported by engagement elements 12 affixed to plural circularly spaced crossbars 14 affixed by screws 15 to the inner side of band 10. Crossbars 14 are of lesser length than the width of band 10 to provide clearances at the band edges for edge-engaging wheels of the welding carriage.

The ends 16, 17 of band 10 are spaced apart by a small distance, as shown. The gap between ends 16, 17 is small enough that the drive wheels of a welding carriage may pass thereover without hesitation or interruption of the welding carriage travel. The gap between band ends 16, 17 is also small enough that the track side engaging wheels may pass smoothly therepast.

The track 10 as stated is a relatively thin band or strap bent smoothly to curve about the pipe 11. Track 10 is supported uniformly above the pipe surface by the bars 14 and engagement elements 12. Each of the crossbars 14 has a slot 18 of uniform width at each end, parallely of the inner face of the band 10. The crossbars 14 each have portions inward of the slot 18, toward the pipe 11, which are of uniform thickness, and are resilient with respect to the remainder of the crossbar. The bars 14 are secured to the inner side of the band 10 by a screw 15 at each of its ends as heretofore stated, the screws passing into tapped openings in the bars outward of the slots 18. The engagement elements 12 are each similarly secured to the portions of the bars 14 below the slot 18 by a screw 19 which may be integral with the engagement element or a separate screw.

A flat strip of friction increasing material 10a is fixed to the outer surface of band 10 to insure adequate traction of the carriage, drive wheels.

The track ends 16, 17 are connected together by a latch assembly 20, shown in FIGS. 1 and 2. A latch body 21 has an open ended slot 22 extending from one end. Body 21 also has a closed ended slot 23 adjacent its other end. A latch block 25 fits within slot 22. Block 25 is secured to track end 17 by plural screws 26. A pair of plates 29, 30, disposed flushly together, are connected to the inner side of end 16 of the track by plural screws 31. Latch block 25 has a perforation there-through which extends also through side portions 34, 35 of body 21, and a pivot pin 36 is disposed therethrough, secured to block 25 by a set screw 37.

A cylindrical metal pin 38 is press fitted or otherwise secured through plates 29, 30 and track end 16 to extend upwardly into recess or slot 23 of latch body 21. The latch body 21 is pivotal about pin 36, and therefore may be moved toward and away from end 16 of the track. A block 39 is secured to the inner side of track end 17 and a slot 40 in the ends of plates 29, 30, as shown in FIG. 1, fits against its opposite sides with block 39 within the slot. This structure provides for alignment between track ends 16, 17.

The block 39 has a roll pin 41 disposed laterally therethrough above which the plate 30 may move upon placement of the two track ends together. The latch housing 21 is pivoted against track end 16, with pin 38 passing into slot 23. The latch screw 48 is retracted outwardly during movement of the latch body and is extended inwardly by rotation of knob 49 after the latch body has been placed against the track, so that the inner screw end 50 engages pin 38 for tightening of the track ends together. Screwing in pin 48 moves track end 16 closer to track end 17, as should be clear. Of course, when screw 48 is retracted outwardly by rotation of knob 49, the screw end 50 is disengaged away from pin 38 so that the latch body may be pivotally raised to release the track ends one from the other.

When the screw 48 is screwed in to tighten the track end connection, pressure is exerted inwardly against the engagement elements 12 at their engagements with the pipe. The resiliency afforded by the slots 18 permits the track to be adequately tightened, but at the same time limits longitudinal tension in the track so that failure of the latch assembly is not likely to occur. The crossbar ends can flex only the width of the slot 18. When pipe 11 expands because of heating resulting from welding at the pipe end, the resiliency afforded by slots 18 prevents overtensioning of the latch assembly.

The track is disposed a short preselected distance from the end of the pipe, this distance being designated L in FIG. 4 of the drawings. The positioning of the track with respect to the pipe end will now be described.

Figure 6:
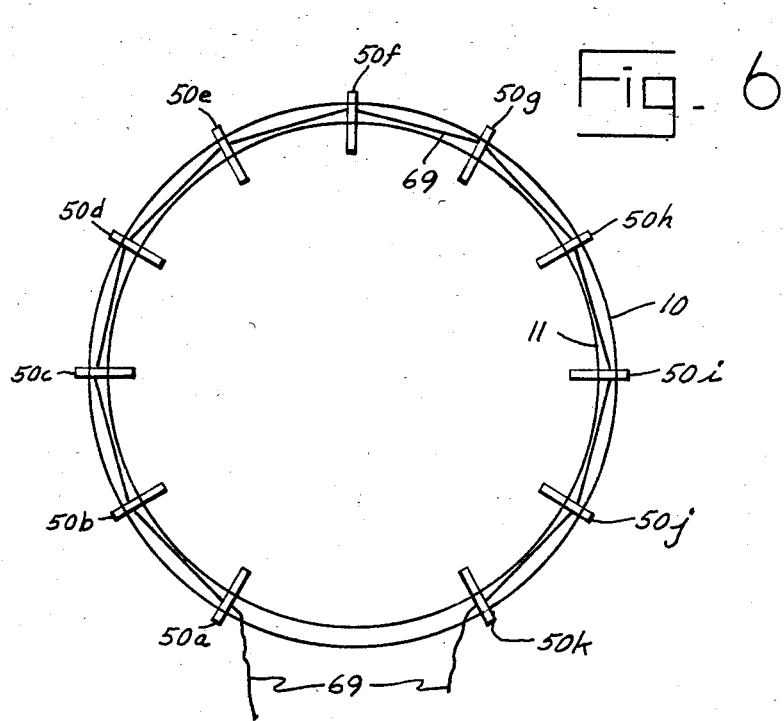
FIG. 6 is a schematic view showing how a plurality of track locator elements are disposed about the periphery of a pipe.

A plurality of locator elements, designated 50a-50k in FIG. 6 of the drawings, each consists of an adjustable locking pliers fitted or modified to provide a spacing function. The pliers are of the "Vise-Grip" type having plates 52-53 at their opposite jaws and designed for holding pieces of hot metal, being used primarily by welders or other metal workers. The pliers as supplied commercially are modified by affixing thereto the blocks 54, 55, an end of each block being inserted into the slot provided at the end of each of plates 52 and 53, the blocks 54, 55 being secured by welding them in place. Block 54 has a pair of holes 57, 58 therethrough, through each of which is fixed a pin 59, 60 press fitted in place or otherwise secured against movement. At the opposite end of each block 54 a pin 61 is secured in an opening in the block, by press fitting, or the like, to extend from the opposite side of the block with respect to the pins 59, 60. A hole 62 is formed between the opposite sides of the block 54. Block 55 has a tapped opening therethrough into which is screwed a screw 64 which is held against movement by jam nut 65. The spacing between the upper end of screw 64 and the underside of block 54 is adjusted to be slightly less than the pipewall thickness of pipe 11, screw 64 being fixed in place as thus adjusted by tightening of nut 65.

Each track locator pliers 50 is secured to the pipe end by squeezing the handles 50x, 50y. The force of gripping of the inner end of screw 64 against the pipe wall may be adjusted by rotation of adjustment screw 66 of the pliers, and release of the pipe end is obtained by moving or flipping lever 67 of the pliers, all as well known in the art. The adjustable locking pliers, as supplied in commerce, do not form a part of this invention, being a commercial item available at many stores. The modified form of pliers, adapted for use as track locator apparatuses are claimed as inventive elements of this invention.

Referring now to FIG. 5 of the drawings, there is shown a block 54 as shown in FIG. 4, having a cable 69 or other elongate connecting element disposed through the opening 62 through the block. The cable is secured in position in the opening 62 by a pair of washers 70. Washers 70 are of the internal spring-slotted type which can be pressed against body 54 from opposite sides and which cooperate to prevent movement of cable 69 through opening 62 in either direction, yet may be loosened to enable movement of the cable through opening 62. Thus, the pliers 50 may be placed along the length of cable 69 at any desired locations corresponding to the size of pipe 11. The attachment of the pliers to a strand, such as a cable, permits easy location of the pliers for setting the track in proper spacing from the pipe end. As before stated, the pliers may be moved along the cable to have their positions adapted for any size of pipe. Any suitable number of the pliers assemblies 50 may be used, a minimum of three being necessary for adequate location of the track with respect to the pipe end. The pliers assemblies are affixed to the pipe end, with pins 59, 60 against the pipe end, and with the track loosely disposed about the pipe, and then the track may be driven or pushed against the pins 61 of the locator pliers to be in proper position, after which screw 48 is tightened to secure the track firmly in place. After this has been done, the plier assemblies may be removed and retained for use at another pipe end.

It will be understood that the invention provides an improved welding carriage track, which is capable of permitting pipe expansion and contraction, and which permits resilient tightening of the track about the pipe. The improved locator devices are easy to use and dependably locate the track with respect to the pipe end.

While preferred embodiments of the invention have been described and shown in the drawings, many modifications thereof may be made by a person skilled in the art without departing from the spirit of the invention, and it is intended to protect by Letters Patent all forms of the invention falling within the scope of the following claims.

I claim:

1. Track apparatus for travel of a carriage about a convexly curved object to do work on the convexly curved object, comprising a metal band of uniform width and of relatively small thickness and of a length to encircle said object when spaced at a uniform small distance therefrom, a plurality of circularly spaced crossbars each of uniform rectangular cross sections fixed transversely at the inner face of said band over the length of said band, each said crossbar having a slot of uniform width at each end parallely of said inner face of said band, each said crossbar having portions inward of said slots, towards said curved object, which are of uniform thickness and are resilient with respect to the remainder of the crossbar and the outward resilient movement thereof being limited by the width of said slot, said portions inward of said slots each having an inwardly protruding object engagement element affixed thereto to move therewith, latch means at the ends of said band for mutually fixing said band ends together and for driving said band ends one toward the other to tension said band to draw said engagement elements firmly against said convexly curved object whereby said band is securely fixed about said object.

2. The combination of claim 1, said outwardly convex object being a cylindrical pipe, said apparatus including a plurality of flexibly linked locating means for locating said band at a uniform distance from an end of said pipe at plural spaced locations around the circumference of the pipe.

3. The combination of claim 2, said locating means comprising plural adjustable locking pliers each having pipe end contacting surface means and band edge contacting surface means spaced a predetermined distance, whereby when said pliers are clamped onto the end of a pipe in circularly spaced relation with said pipe end contacting surface means engaged against an end of said pipe and said band is moved against said band edge contacting surface means of each of said pliers said band is uniformly spaced from said pipe end.

4. The combination of claim 3, pipe end contacting surface means and band edge contacting surface means of said adjustable locking pliers comprising a first block affixed to one jaw and a second block affixed to the other jaw such that said blocks are aligned and generally parallel when said jaws are closed, said first block having first protruding means for engaging the end of the pipe wall and having second protruding means for engaging an edge of a welding carriage track, said first and second protruding means being spaced by a preselected spacing equal to the distance that a welding carriage track is to be spaced from the pipe end, whereby when said pliers are locked to grip the end of a pipe wall with said first protruding means disposed against the end of the pipe wall the second protruding means is disposed to form a guide for location of said welding carriage track.

5. The combination of claim 4, said apparatus including a plurality of said adjustable locking pliers, and including means linking said pliers together so that said pliers are spaced about the wall of a pipe according to their positions on said linking means.

6. The combination of claim 5, said apparatus including at least three of said pliers.

7. The combination of claim 6, said pliers being adjustably fixed along said linking means whereby their positions are adjustable for differing sizes of pipes.

8. Track locator apparatus for use in spacing a surrounding welding carriage track from the end of a convex object, comprising a plurality of adjustable locking pliers, a first block fixed to one jaw of each said pliers, a second block fixed to the other jaw of each said pliers, said blocks being aligned and generally parallel when said jaws are closed with inner surfaces thereof mutually facing one another, said first block having first protruding pin means at said inner surface thereof for engaging the end of a pipe and having second protruding pin means at its outer surface opposite said inner surface thereof for engaging an edge of a welding carriage track, said second block having third adjustably protruding pin means at said inner surface thereof and disposed between said first and second pin means of said first block for engaging the interior surface of a pipe, said first and second protruding pin means being spaced by a preselected spacing equal to the distance that a welding carriage track is to be spaced from the pipe end, whereby when said pliers are locked to grip the end of a pipe wall with said first protruding means disposed against the end of the pipe wall the second protruding means is disposed to form a guide for location of said welding carriage track.

9. The combination of claim 8, said pliers being adjustably fixed along a linking means whereby their positions are adjustable for differing sizes of pipes.

10. The combination of claim 8, said apparatus including at least three of said pliers.

* * * * *